(No Model.)
G. W. TREXLER.
HEATING APPARATUS.
No. 369,304. Patented Aug. 30, 1887.
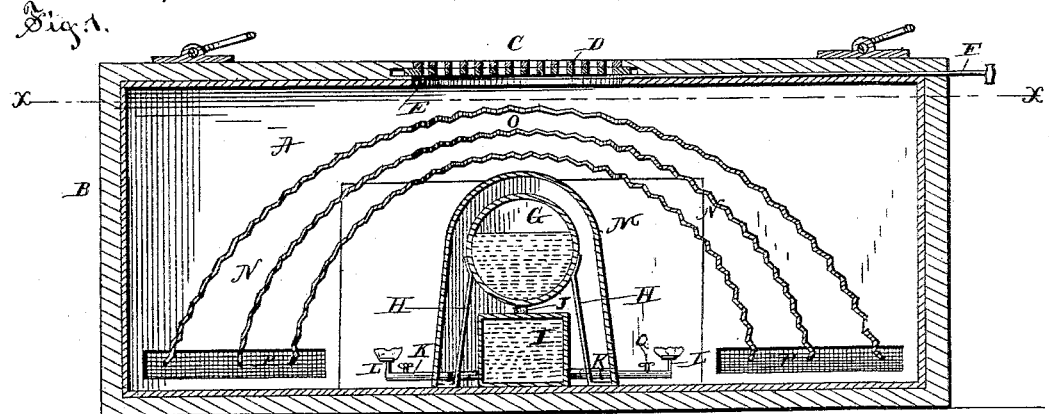
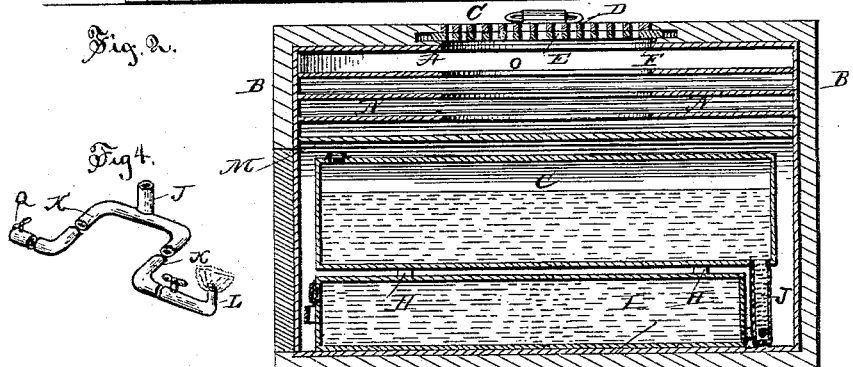
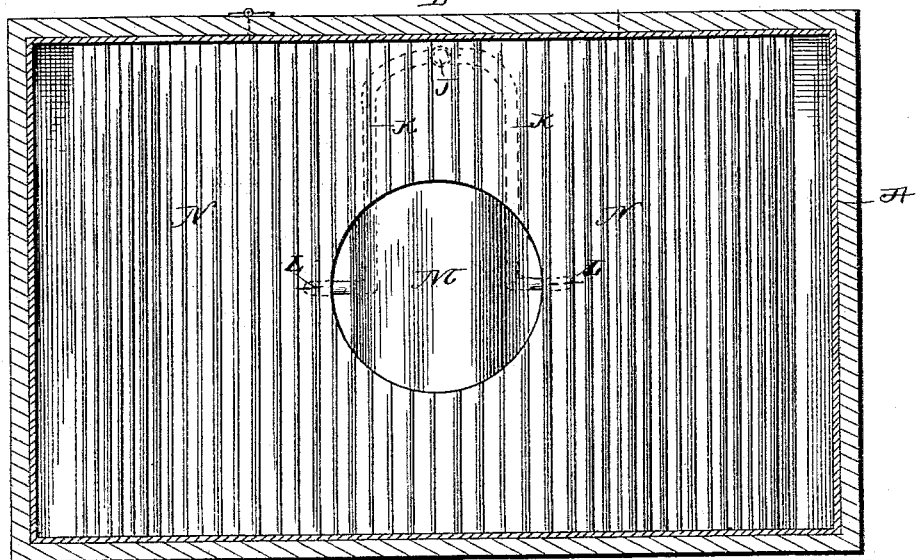
WITNESSES
INVENTOR
George W. Trexler
by Louis Bagger & Co.
Attorneys

UNITED STATES PATENT OFFICE.

GEORGE W. TREXLER, OF ORBISONIA, PENNSYLVANIA.

HEATING APPARATUS.

SPECIFICATION forming part of Letters Patent No. 369,304, dated August 30, 1887.

Application filed May 8, 1886. Serial No. 201,570. (No model.)

*To all whom it may concern:*

Be it known that I, GEORGE W. TREXLER, a citizen of the United States, and a resident of Orbisonia, in the county of Huntingdon and State of Pennsylvania, have invented certain new and useful Improvements in Heating Apparatus; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical sectional view of my improved heating apparatus. Fig. 2 is a transverse section of the same. Fig. 3 is a horizontal sectional view on line $x\,x$, Fig. 1, and Fig. 4 is a broken detail view of the oil-pipe.

Similar letters of reference indicate corresponding parts in all the figures.

My invention has relation to portable heating apparatus adapted to be used as foot-warmers in vehicles, as plate-warmers, portable cooking apparatus, or any other purpose where a portable heating apparatus is desired; and it consists in the improved construction and combination of parts of such an apparatus, as hereinafter more fully described and claimed.

In the accompanying drawings, the letter A indicates a sheet-metal box having an outer covering, B, of a non-conducting material—such as wood or any other suitable material suitably finished—and the top of this casing and its outer covering is formed with a circular aperture, C, in its middle, which aperture is covered with an open register-plate, D, having a suitable damper or correspondingly-apertured plate, E, sliding below it and provided with a suitable handle or rod, F, whereby the said damper may be slid so as to close the apertures in the register-plate.

A cylindrical reservoir, G, is supported within the casing upon feet H, and is provided at its rear end with a downwardly-extending pipe, J. To the bottom of this pipe a cross-pipe, K, is secured, the ends of which project forwardly to about the middle of the casing, and then extend laterally a short distance and terminate in burners L L, which are supplied with stop-cocks Q, which regulate the flow of oil from the reservoir G. Between the feet H, and below the reservoir G, is placed a removable tank, I, in which is stored the supply of oil with which to refill the reservoir when it becomes empty. The oil in the tank and reservoir is kept from becoming overheated when the device is used by means of a shield, M, which is secured to the bottom of the casing, between the burners and the tank, and extends completely over the reservoir.

Curved shields or deflectors N are secured with their side edges to the side pieces of the box, and have circular apertures O in their middles, registering with the aperture in the top of the box, and extend with their ends to near the bottom of the box, forming curved channels between them, and the side pieces of the box are provided with slots or apertures P P near the ends and near the lower edges, which slots register with the lower ends of the channels formed by the curved shields. These slots or apertures are preferably covered with wire-netting or similar perforated material, and cold air may enter through the apertures and pass up through the curved channels, being heated by the curved shields, which are heated from the burners, the heated air escaping through the central apertures of the shields.

The shields are preferably corrugated for the purpose of offering larger surfaces, and the heat from the burners will be sufficient to heat all the shields and the air passing between them.

The escaping hot air may be regulated by the damper sliding under the register-plate, and the heat passing up through the register-plate may be utilized for the purpose of heating the bottoms of sleighs or vehicles during cold weather, the apparatus acting as a foot-warmer; or the apparatus may be used for heating dishes, or for cooking, or for any other purpose where a portable heater is desired.

One side of the box is preferably hinged, or provided with a hinged door, through which access may be had to the burners and to the reservoir, as well as to the extra tank, from which the reservoir may be filled when empty by taking out the removable tank and filling the reservoir. Any suitable fluid may be used for the purpose of feeding the burners, either oil or hydrocarbons.

The box may be ornamented in any suitable manner, and may be provided with suitable handles for carrying it, and it may be covered with any suitable non-conducting material—wood, felt, or any suitable textile material.

Having thus described my invention, I claim and desire to secure by Letters Patent of the United States—

1. In a portable heater, the combination of a box having an aperture in the center of its top provided with a register-plate and damper, and having slots or apertures in the side pieces, at the lower edges of the same, near the ends of the box, curved and corrugated shields secured with their side edges to the side pieces of the box and extending nearly to the bottom thereof, having central apertures registering with the aperture in the top of the box and forming curved channels between them, a heater placed under said shields and provided with laterally-extending burners, and a casing interposed between said burners and the reservoir of the heater, as and for the purpose set forth.

2. The combination, with the within-described box, of a heater consisting of a cylindrical reservoir supported transversely in said box, a pipe passing downwardly from one end of the reservoir, a cross-pipe connected to the lower end of said pipe, suitable burners located upon the ends of the cross-pipe, and a casing interposed between the burners and the reservoir, as and for the purpose set forth.

3. The combination, with the within-described box provided with a door, shields, and a register-plate, of legs secured to the bottom of said box, a tank secured to the top of said legs, a pipe at one end of said tank projecting downward, a cross-pipe secured to the end of said pipe, the ends of which project laterally, then forwardly, and again laterally, and suitable burners at the ends of said cross-pipe.

In testimony that I claim the foregoing as my own I have hereunto affixed my signature in presence of two witnesses.

GEORGE W. TREXLER.

Witnesses:
LOUIS BAGGER,
AUGUST PETERSON.